US011556744B1

(12) United States Patent
Joshi et al.

(10) Patent No.: US 11,556,744 B1
(45) Date of Patent: *Jan. 17, 2023

(54) AUTO LABELER

(71) Applicant: Waymo LLC, Mountain View, CA (US)

(72) Inventors: Aditya Joshi, Saratoga, CA (US); Ingrid Fiedler, Mountain View, CA (US); Lo Po Tsui, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/116,255

(22) Filed: Dec. 9, 2020

Related U.S. Application Data

(63) Continuation of application No. 16/220,100, filed on Dec. 14, 2018, now Pat. No. 10,891,518.

(51) Int. Cl.
  *G06K 9/62*  (2022.01)
  *G01S 17/89*  (2020.01)
  (Continued)

(52) U.S. Cl.
  CPC .......... *G06K 9/6257* (2013.01); *G01S 17/04* (2020.01); *G01S 17/58* (2013.01); *G01S 17/89* (2013.01);
  (Continued)

(58) Field of Classification Search
  None
  See application file for complete search history.

(56) References Cited

U.S. PATENT DOCUMENTS 10,891,518 B1 * 1/2021 Joshi ............... G01S 13/865
2017/0075356 A1  3/2017 Delp
(Continued)

OTHER PUBLICATIONS

Gezero, et al., "A Registration Method of Point Clouds Collected by Mobile Lidar Using Solely Standard Las Files Information", The International Archives of the Photogrammetry, Remote Sensing and Spatial Information Sciences, vol. XLII-1/W1, 2017 ISPRS Hannover Workshop: HRIGI 17—CMRT 17—ISA 17—EuroCOW 17, Hannover, Germany, Jun. 6-9, 2017, pp. 121-128.

(Continued)

*Primary Examiner* — Leon Flores
(74) *Attorney, Agent, or Firm* — Botos Churchill IP Law

(57) ABSTRACT

Aspects of the disclosure relate to training a labeling model to automatically generate labels for objects detected in a vehicle's environment. In this regard, one or more computing devices may receive sensor data corresponding to a series of frames perceived by the vehicle, each frame being captured at a different time point during a trip of the vehicle. The computing devices may also receive bounding boxes generated by a first labeling model for objects detected in the series of frames. The computing devices may receive user inputs including an adjustment to at least one of the bounding boxes, the adjustment corrects a displacement of the at least one of the bounding boxes caused by a sensing inaccuracy. The computing devices may train a second labeling model using the sensor data, the bounding boxes, and the adjustment to increase accuracy of the second labeling model when automatically generating bounding boxes.

20 Claims, 10 Drawing Sheets

(51) Int. Cl.
  *G06N 20/20* (2019.01)
  *G01S 17/58* (2006.01)
  *G01S 17/04* (2020.01)
  *G06V 20/20* (2022.01)
  *G06V 20/58* (2022.01)

(52) U.S. Cl.
  CPC ............ *G06N 20/20* (2019.01); *G06V 20/20* (2022.01); *G06V 20/58* (2022.01)

(56) References Cited

U.S. PATENT DOCUMENTS

2018/0203447 A1  7/2018  Wyffels
2020/0019799 A1  1/2020  Shen et al.

OTHER PUBLICATIONS

Habib, et al., "Impact of Lidar System Calibration on the Relative and Absolute Accuracy of the Adjusted Point Cloud", Feb. 2010, 6 pages.
Li, et al., "Deep Learning for 2D Scan Matching and Loop Closure", Available Online at: <https://www.researchgate.net/publication/321816644>, 2017, 8 pages.
Nicolai, et al., "Deep Learning for Laser Based Odometry Estimation", School of Mechanical, Industrial & Manufacturing Engineering, Oregon State University, Corvallis, Oregon, 2016, 6 pages.
Park, et al., "Elastic LiDAR Fusion: Dense Map-Centric Continuous-Time SLAM", Mar. 5, 2018, 8 pages.
Piewak, et al., "Boosting LiDAR-based Semantic Labeling by Cross-Modal Training Data Generation", Apr. 26, 2018, 16 pages.

\* cited by examiner

AUTO LABELER

CROSS REFERENCE TO RELATED APPLICATIONS

The present application is a continuation of U.S. patent application Ser. No. 16/220,100, filed Dec. 14, 2018, the entire disclosure of which is incorporated herein by reference.

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

In order to safely operate on the road, autonomous vehicles are equipped with various types of sensors in order to detect objects in the surroundings. For example, autonomous vehicles may include sonar, radar, camera, LIDAR, and other devices that scan and record sensor data from the vehicle's surroundings. Such sensor data may be reviewed by a user (such as a remote human operator) in order to identify various objects in the vehicle's environment. For example, bounding boxes may be manually drawn around the identified objects. Subsequently, these bounding boxes may be reviewed by other users in order to verify the bounding boxes. The process of generating and reviewing bounding boxes require significant amount of manual labor, which may be time consuming and expensive.

BRIEF SUMMARY

Aspects of the disclosure provides for receiving, by one or more computing devices from one or more sensors of a vehicle, sensor data corresponding to a series of frames perceived by the vehicle, each frame being captured at a different time point during a trip of the vehicle; receiving, by the one or more computing devices, bounding boxes generated by a first labeling model for objects detected in the series of frames; receiving, by the one or more computing devices, one or more user inputs including at least one adjustment to at least one of the bounding boxes, the adjustment corrects a displacement of the at least one of the bounding boxes caused by a sensing inaccuracy; and training, by the one or more computing devices, a second labeling model using the sensor data, the bounding boxes, and the adjustment to increase accuracy of the second labeling model when automatically generating bounding boxes.

The method may further comprise generating, by the one or more computing devices, at least one adjusted bounding box based on the at least one adjustment, wherein training the second labeling model may be further based on the at least one adjusted bounding box.

The sensing inaccuracy may result in a stationary object appearing to move between frames when the at least one of the bounding boxes of a first frame of the series of frames is compared to a respective bounding box of a second frame of the series of frames. The sensing inaccuracy may result in a moving object appearing to have a jittering trajectory when the at least one of the bounding boxes of a first frame of the series of frames is compared to a respective bounding box of a second frame of the series of frames.

The method may further comprise receiving, by the one or more computing devices, bounding boxes generated by the first labeling model for connected features of an object detected in a plurality of frames; receiving, by the one or more computing devices, one or more user inputs including at least one adjustment to the bounding boxes for the connected features, the adjustment corrects a displacement of at least one of the bounding boxes for the connected features, wherein the displacement causes the bounding boxes for the connected features to become separated in at least one of the plurality of frames; training, by the one or more computing devices, the second labeling model using the bounding boxes and the adjustment to the bounding boxes for the connected features, in order to automatically generate bounding boxes for connected features of an object that remain connected in a plurality of frames. The method may further comprise receiving, by the one or more computing devices, reference data on objects with connected features; further training, by the one or more computing devices, the second labeling model using the reference data in order to identify whether any object detected in the series of frames have connected features.

The first labeling model may be configured to automatically generate a position of the vehicle for each frame of the series of frames, and to automatically generate a trajectory of the vehicle based on the position for each frame of the series of frames. The method may further comprise receiving, by the one or more computing devices, the trajectory of the vehicle automatically generated by the first labeling model; receiving, by the one or more computing devices, one or more user inputs including at least one adjustment to the trajectory, the adjustment to the trajectory corrects jittering of the trajectory; training, by the one or more computing devices, the second labeling model using the sensor data, the trajectory, and the adjustment to the trajectory to automatically generate a smooth trajectory for the vehicle.

The first labeling model may be configured to automatically select a set of key frames among the series of frames, the set of key frames being frames based on which intermediate positions of a particular object detected in the set of key frames can be determined with errors within a predetermined threshold. The method may further comprise receiving, by the one or more computing devices, the set of key frames automatically selected by the first labeling model for the particular object detected in the set of key frames; and generating, by the one or more computing devices using sensor data corresponding to the set of key frames, an interpolated trajectory for the particular object. The method may further comprise presenting, by the one or more computing devices, sensor data and bounding boxes corresponding to the set of key frames, and the interpolated trajectory for review by a user. The method may further comprise receiving, by the one or more computing devices, the set of key frames automatically selected by the first labeling model; selecting, by the one or more computing devices, sensor data and bounding boxes corresponding to the key frames for training the second labeling model to increase accuracy of the second labeling model when automatically generating bounding boxes.

The second labeling model may be configured to identify a frame, among the series of frames, in which a particular object is detected to be closest to the vehicle compared to other frames in which the particular object is also detected, and to determine one or more properties for the particular object using sensor data corresponding to the identified frame. The second labeling model may be configured to automatically generate labels for the particular object for all the other frames in which the particular object is detected using the same one or more properties.

The method may further comprise categorizing, by the one or more computing devices, one or more areas detected in the sensor data as no-label zones; preparing, by the one or more computing devices, training data excluding sensor data and bounding boxes for objects detected in the no-label zones, wherein training the second labeling model is using the training data.

The method may further comprise sending, by the one or more computing devices, the trained second labeling model to one or more computing devices of the vehicle for use onboard the vehicle. The first labeling model may be different from the second labeling model. The second labeling model may be the first labeling model, such that the trained second labeling model is an updated version of the first labeling model.

The disclosure further provides for a system for training a labeling model, comprising one or more computing devices configured to receive from one or more sensors of a vehicle, sensor data corresponding to a series of frames perceived by the vehicle, each frame being captured at a different time point during a trip of the vehicle; receive bounding boxes generated by a first labeling model for objects detected in the series of frames; receive one or more user inputs including at least one adjustment to at least one of the bounding boxes, the adjustment corrects a displacement of the at least one of the bounding boxes caused by a sensing inaccuracy; and train a second labeling model using the sensor data, the bounding boxes, and the adjustment to increase accuracy of the second labeling model when automatically generating bounding boxes.

The one or more computing devices may be further configured to receive bounding boxes generated by the first labeling model for connected features of an object detected in a plurality of frames; receive one or more user inputs including at least one adjustment to the bounding boxes for the connected features, the adjustment corrects a displacement of at least one of the bounding boxes for the connected features, wherein the displacement causes the bounding boxes for the connected features to become separated in at least one of the plurality of frames; train the second labeling model using the bounding boxes and the adjustment to the bounding boxes for the connected features in order to automatically generate bounding boxes for connected features of an object remain connected in a plurality of frames.

DETAILED DESCRIPTION

Overview

Figure 1:
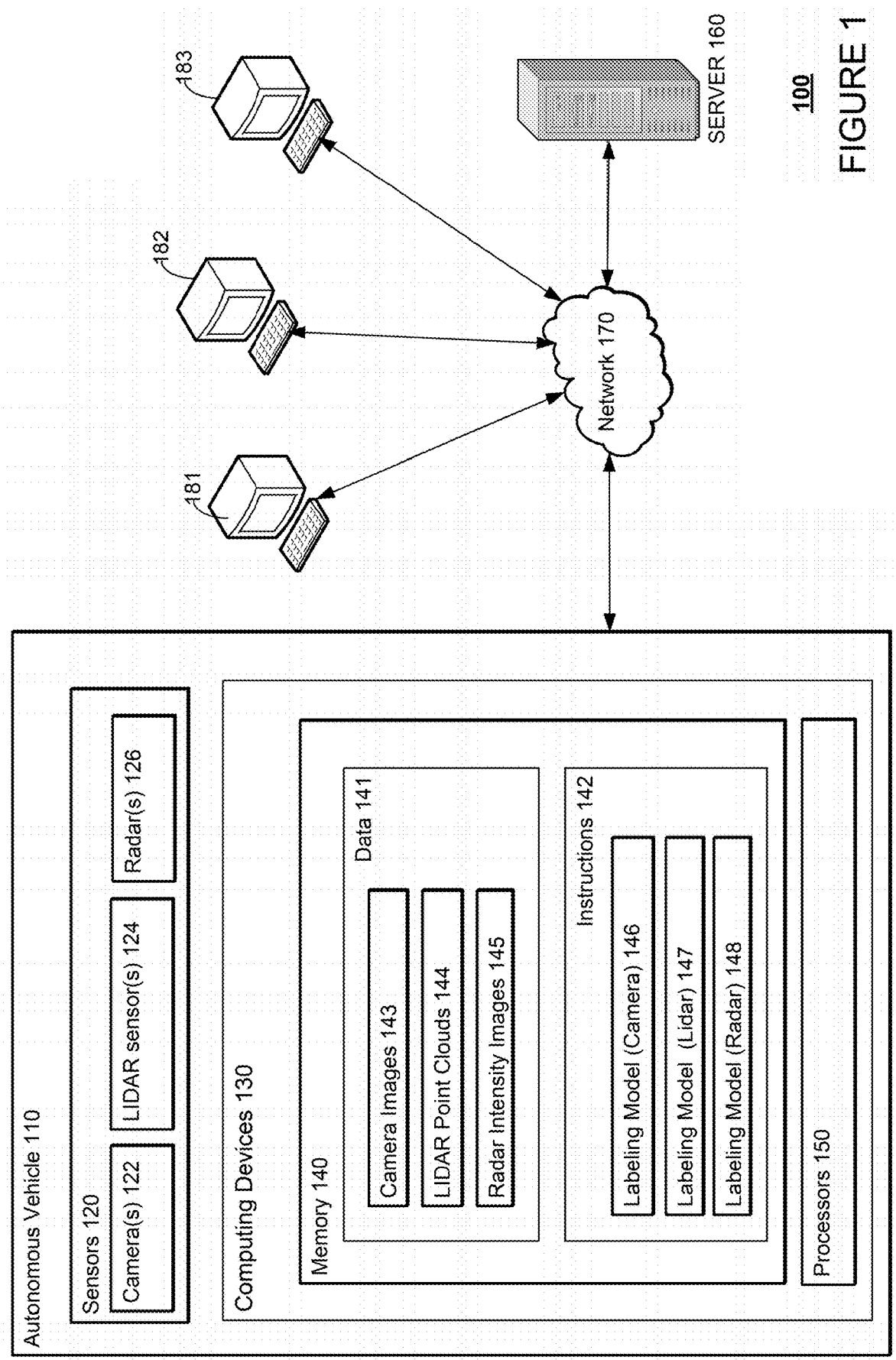
FIG. 1 is a functional diagram of an example system in accordance with aspects of the disclosure.

The technology relates generally to training a labeling model to automatically generate bounding boxes for objects captured in sensor data. For instance, in order to safely control an autonomous vehicle, the vehicle's perception system may use sensors to capture sensor data for the vehicle's environment. Such sensor data may be reviewed by a user (such as a remote human operator) in order to identify various objects in the vehicle's environment. For example, bounding boxes may be manually drawn around the identified objects. Subsequently, these bounding boxes may be reviewed by other users in order to verify the bounding boxes. The process of generating and reviewing bounding boxes require significant amount of manual labor, which may be time consuming and expensive. In particular, the initial stage of manually drawing the bounding boxes may be significantly more expensive than later stages of reviewing and adjusting existing bounding boxes.

A system may be configured to automatically generate bounding boxes using a first labeling model. However, due to sensing inaccuracies, the first labeling model may automatically generate bounding boxes that are displaced between consecutive frames. For example, measurement errors in a localization sensor(s) of the vehicle's perception system may cause a drift in the LIDAR sensor data. Such a sensor drift may cause bounding boxes generated for a stationary object to be displaced between consecutive frames, which may result in the stationary object appearing to move between consecutive frames. Such a sensor drift may also cause bounding boxes generated for a moving object to be displaced between consecutive frames, which may result in the moving object appearing to have a jittering trajectory even though the object has a smooth trajectory. To address these and other sensing inaccuracies, a second labeling model may be trained to recognize displacements of bounding boxes caused by such sensing inaccuracies, and to automatically generate bounding boxes accounting for these sensing inaccuracies. In some instances, the first labeling model may be the same as the second labeling model such that, after training, the trained second labeling model is simply an updated version of the first labeling model. In other instances, the first labeling model and the second labeling models may be different models. For example, the first labeling model may be one that is used for automatically generating labels for reviewers, while the second labeling model may be one that is used onboard an autonomous vehicle.

In this regard, the first labeling model may automatically generate bounding boxes for objects detected in sensor data corresponding to a series of scenes or frames perceived by a vehicle during a trip or trip segment. The sensor data may be taken by one or more sensors of a vehicle at a series of time points during the trip or trip segment. These automatically generated bounding boxes may be reviewed by a user, and adjusted to correct displacements of bounding boxes caused by sensing inaccuracies. Subsequently, the second labeling model may be trained using the adjusted bounding boxes to learn patterns, such as whether and how bounding boxes should be adjusted to account for displacements caused by sensing inaccuracies.

The second labeling model may be additionally trained to recognize connected features of a detected object in sensor data corresponding to consecutive frames perceived by the vehicle. When the automatically generated bounding boxes from the first labeling model are reviewed by the user as described above, the user may also adjust the automatically generated bounding boxes to correct displacements of the bounding boxes for connected features caused by sensing inaccuracies. For instance, the displacements may cause the bounding boxes for the connected features to become separated in consecutive frames. Subsequently, the second labeling model may be trained using the adjusted bounding boxes to learn patterns, such as whether and how bounding boxes for connected features should be adjusted between consecutive frames. Additionally or alternatively, the second labeling model may be trained to reference real-world data when automatically generating bounding boxes for connected features.

In addition, the first and/or the second labeling model may be configured to automatically generate a trajectory for the vehicle for the trip or trip segment based on the sensor data. For instance, the first labeling model may be configured to determine a position of the vehicle in the sensor data, and connect the positions in the sensor data corresponding to consecutive frames to generate a trajectory for the vehicle.

Further in this regard, the second labeling model may be trained to perform smoothing of the automatically generated trajectory. For instance, a user may review the automatically generated trajectory of the vehicle by the first labeling model, and adjust one or more positions in the trajectory to remove jittering in the trajectory. Subsequently, the second labeling model may be trained using the adjusted trajectory to learn patterns, such as whether jittering exists in a trajectory and how to adjust the trajectory to remove jittering.

Still further, the first and/or the second labeling model may be configured to select a set of key frames among the series of frames perceived by the vehicle during the trip or trip segment. A set of key frames may include a first key frame in which a particular object is initially detected, a last key frame in which the particular object is finally detected, and one or more additional frames selected among intermediate frames between the first key frame and the last key frame. The set of key frames may be selected such that, based on the set of key frames, intermediate positions of the particular object can be accurately interpolated in order to interpolate a trajectory for the particular object.

The first and/or the second labeling model may be further configured to identify a frame amongst a series of frames in which a particular object is most clearly detected, and determine one or more properties (such as object type, size, etc.) for the particular object based on the identified frame. The first and/or the second labeling model may be configured to use the properties determined based on the identified frame for all other frames in which the particular object is also detected.

The features described herein may allow labels to be automatically generated for objects detected in sensor data corresponding to a series of frames perceived by a vehicle during a trip or trip segment. This may reduce or eliminate the need for time-consuming and expensive manual labeling. In addition, labels that are generated may also be automatically corrected to account for sensing inaccuracies as well as to track features between consecutive frames, which may reduce the effort of users when reviewing the automatically generated labels. The features further provide for automatically generating a smooth trajectory of the vehicle. Key frames may additionally be identified among the series of frames to allow accurate interpolation of positions of a detected object. The features further provide for determining properties of a detected object (such as object type, size, etc.), and keeping the properties of the object constant in labels generated for other frames in which the same object is also detected.

Example Systems

FIG. 1 illustrates an example system 100 for training a labeling model according to aspects of the disclosure. The system 100 includes an autonomous vehicle 110 configured to communicate with a server 160. The autonomous vehicle 110 may be configured to operate autonomously, that is, drive without the assistance of a human driver. While certain aspects of the disclosure are particularly useful in connection with specific types of vehicles, the autonomous vehicle 110 may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys.

The autonomous vehicle 110 may be equipped with various types of sensors 120 in its perception system for detecting objects near and/or around with the autonomous vehicle 110. For example, the autonomous vehicle 110 may be equipped with one or more cameras 122 for capturing sensor data on objects in front of and/or behind the autonomous vehicle 110. As another example, the autonomous vehicle 110 may be equipped with one or more LIDAR sensors 124 for detecting objects near and/or around the autonomous vehicle 110. For instance, the one or more LIDAR sensors 124 may perform a 360° scan around the autonomous vehicle 110, one or more such scans may correspond to a "scene" or "frame" observed by the autonomous vehicle 110. As still another example, the autonomous vehicle 110 may be equipped with one or more radars 126 for detecting objects near and/or around the autonomous vehicle 110. While FIG. 1 illustrates that the autonomous vehicle 110 may be equipped with one or more cameras 122, one or more LIDAR sensors 124, and one or more radars 126, the autonomous vehicle 110 may be equipped with alternative arrangements of sensors. For example, the autonomous vehicle 110 may be equipped with sonar technology, infrared technology, accelerometers, gyroscopes, magnetometers, or any other type of sensor for detecting objects near and/or around the autonomous vehicle 110.

Figure 2:
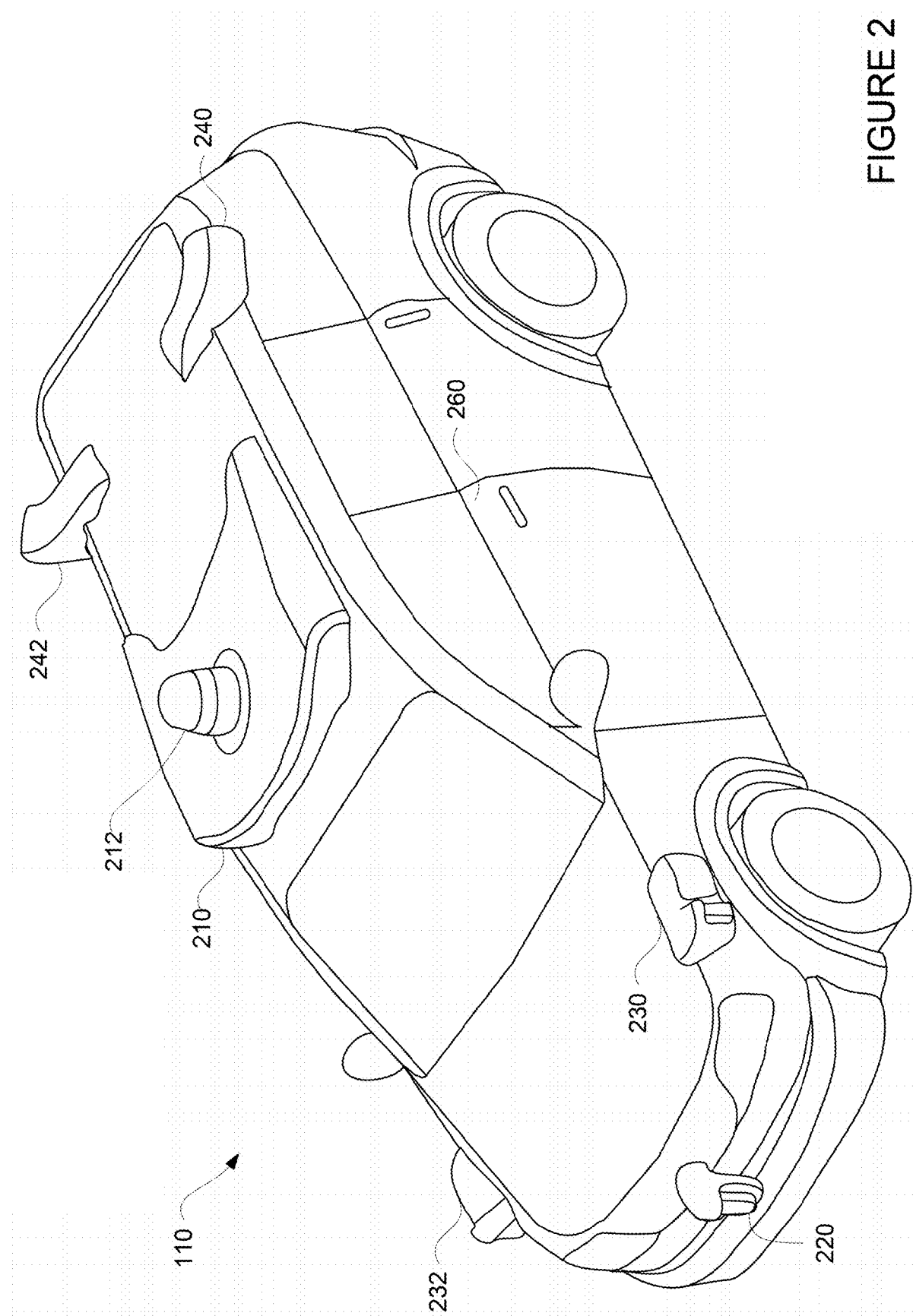
FIG. 2 is an example external view of a vehicle in accordance with aspects of the disclosure.

For instance, FIG. 2 is an example external view of autonomous vehicle 110 with various sensors. In this example, roof-top housing 210 and dome housing 212 may include a LIDAR sensor as well as various cameras and radar units. In addition, housing 220 located at the front end of autonomous vehicle 110 and housings 230, 232 on the driver's and passenger's sides of the vehicle may each store a LIDAR sensor. For example, housing 230 is located in front of driver door 260. Autonomous vehicle 110 also includes housings 240, 242 for radar units and/or cameras also located on the roof of autonomous vehicle 110. Additional radar units and cameras (not shown) may be located at the front and rear ends of autonomous vehicle 110 and/or on other positions along the roof or roof-top housing 210.

Referring back to FIG. 1, the autonomous vehicle 110 may include one or more computing devices, such as computing devices 130 containing memory 140, one or more processors 150, and other components typically present in general purpose computing devices.

The memory 140 stores information accessible by the one or more processors 150, including data 141 and instructions 142 that may be executed or otherwise used by the processors 150. The memory 140 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 141 may be retrieved, stored or modified by processor 150, for example in accordance with the instructions 142. For instance, although the claimed subject matter is not limited by any particular data structure, the data 141 may be stored in computing device registers, in a relational database as a table having a plurality of different fields and records, XML documents or flat files. The data 141 may also be formatted in any computing device-readable format.

The memory 140 may store in data 141 sensor data captured by one or more of the sensors 120. The captured sensor data may include camera images 143 captured using the one or more cameras 122, LIDAR point clouds 144 captured using the one or more LIDAR sensors 124, and/or radar intensity images 145 captured using the one or more radars 126. Depending on the type of sensors used by the autonomous vehicle 110, the memory 140 may store other types of sensor data in data 141. Metadata associated with the sensor data may also be stored along with the captured sensor data. The sensor data may be formatted in any computer-readable format. For example, sensor data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics.

The camera images 143 may include one, two, or three-dimensional images having a predetermined number of megapixels. The camera images 143 may further be in color, black and white, or in any other format. The one or more cameras 122 may be configured to capture the one or more camera image(s) 143 at predetermined time intervals, such as every millisecond, every second, every minute, or at any other interval of time. Other measurements of capturing images may also be possible, such as 30 frames per second ("fps") 60 fps, or any other measurement.

The LIDAR point clouds 144 may include LIDAR points representing a predetermined view angle near and/or around the autonomous vehicle 110. For example, the LIDAR point clouds 144 may include one or more 360° scans of the environment around the autonomous vehicle 110, where each 360° scan may be considered a scene or frame perceived by the vehicle. Depending on the features of the LIDAR sensors that generated the LIDAR point clouds, LIDAR point clouds 144 may include a predetermined number of LIDAR points, such as 50,000 LIDAR points, 80,000 LIDAR points, 100,000 LIDAR points, or any other number of LIDAR points. As with the camera images 143, the autonomous vehicle 110 may be configured to capture the one or more LIDAR point clouds 144 at predetermined time intervals, such as 10 fps, 30 fps, every millisecond, every second, or at any other interval of time.

The radar intensity images 145 may include one or more images captured using a radar technology. As with the LIDAR point cloud images 144 or the camera images 143, the radar intensity images 145 may be captured at predetermined time intervals.

The instructions 142 may be any set of instructions to be executed directly (such as machine code) or indirectly (such as scripts) by the processors 150. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The memory 140 may store in instructions 142 various models, including one or more labeling models, such as labeling models 146-148. These labeling models 146-148 may be any configuration of software and/or hardware configured to detect an object in sensor data captured by one or more of the sensors 120, and to automatically generate one or more labels for the detected objects. For example, the labeling model 146 may be configured to detect and label objects in camera images 143, the labeling model 147 may be configured to detect and label objects in LIDAR point clouds 144, and the labeling model 148 may be configured to detect and label objects in radar intensity images 145. The labeling model 147 may be any type of a machine learning model. For example, labeling model 147 may be a neural network or a decision tree model. For another example, the labeling model 147 may be a regression model or a classifier model. For still another example, the labeling model 147 may be a segmentation model, where the model is configured to label each pixel or point in the sensor data with a type and instance.

The one or more processor 150 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 130 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 130. Accordingly, references to a processor or computing device will be understood to include references to a collection of processors or computing devices or memories that may or may not operate in parallel.

Computing devices 130 may also include all of the components normally used in connection with a computing device such as the processor and memory described above as well as a user input (e.g., a mouse, keyboard, touch screen and/or microphone) and various electronic displays (e.g., a monitor having a screen or any other electrical device that is operable to display information). For example, the autonomous vehicle 110 may include an internal electronic display as well as one or more speakers to provide information or audio visual experiences. In this regard, internal electronic display may be located within a cabin of autonomous vehicle 110 and may be used by computing devices 130 to provide information to passengers within the autonomous vehicle 110.

Computing devices 130 may also include one or more wireless network connections to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The autonomous vehicle 110 may be in communication with server computing devices, such as server 160, and/or one or more client devices 181-183. For example, such communication may be established via one or more networks, such as network 170. The network 170 may be implemented as any combination of networks. The network 170 may be various types of networks. As examples, the network may be a Wide Area Network ("WAN"), such as the Internet; a Local Area Network ("LAN"); a Personal Area Network ("PAN"), or a combination of WANs, LANs, and PANs. Moreover, the network 170 may involve the use of one or more wired protocols, such as the Simple Object Access Protocol ("SOAP"); wireless protocols, such as 802.11a/b/g/n, Bluetooth, or WiMAX; transport protocols, such as TCP or UDP; an Internet layer protocol, such as IP; application-level protocols, such as HTTP, a combination of any of the aforementioned protocols, or any other type of protocol.

The client devices 181-183 in communication with the server 160 may be any type of client device. As examples, and without limitation, the client devices 181-183 may include one or more desktop computers and one or more mobile devices. Examples of a mobile device include a desktop, laptop, a smart phone, a tablet computer, or other such mobile device. Accordingly, a human operator may communicate and interact with the server 160 regardless of whether the client devices 181-183 are desktop computers, mobile devices (e.g., laptops, smartphones, PDAs, etc.), or any other such client device.

The server 160 may be configured to generate various tools to allow users to review the captured sensor data and labels automatically generated by labeling models. For instance, the server 160 may generate a labeling application that allows the operators to review sensor data camera images 143, LIDAR point clouds 144, and RADAR intensity images 145 captured by sensors 120 and the labels automatically generated by labeling models 146-148. Further, the labeling application may allow human operators adjust the labels automatically generated by the labeling models 146-148.

Figure 3:
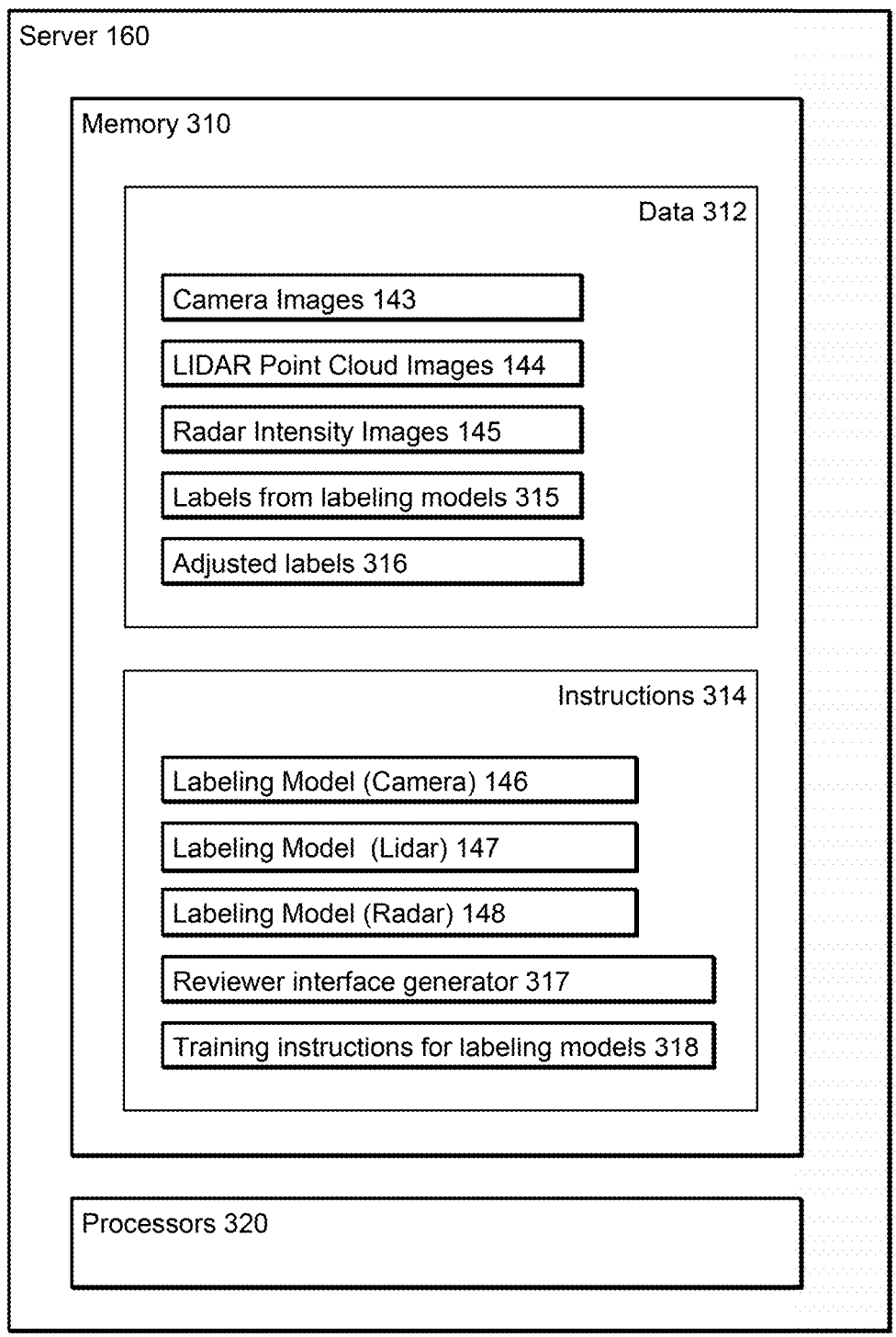
FIG. 3 shows an example server in accordance with aspects of the disclosure.

FIG. 3 illustrates one example of the server 160 according to aspects of the disclosure. The server 160 may include a memory 310 and one or more processors 320. The memory 310 may be any type, such as random access memory ("RAM"), read-only memory ("ROM"), hard disks, floppy disks, CD-ROMs, flash memory or other types of computer memory. In addition, the memory 310 may be distributed across many different types of computer-readable media. The processors 320 may be a microprocessor, a microcontroller, a DSP, an ASIC, discrete analog or digital circuitry, or a combination of other types of circuits or logic. In addition, the processors 320 may be distributed across many different types of processors.

The memory 310 may store various types of data 312. For example, the server 160 may receive from autonomous vehicle 110 captured sensor data, such as camera images 143, LIDAR point clouds 144, and RADAR intensity images 145 captured by sensors 120. The server 160 may also receive metadata associated with these sensor data. The server 160 may store these received sensor data and/or the associated metadata to data 312. For another example, the server 160 may receive from autonomous vehicle 110 automatically generated labels from labeling models 315, such as labeling models 146-148. For still another example, the server 160 may receive from users, for example through client devices such as client devices 181-183, adjusted labels 316. The server 160 may store these automatically generated labels from labeling models 315 and adjusted labels 316 in the data 312. The server 160 may also store values such as thresholds and parameters for the labeling models 146-148 in data 312.

The memory 310 may also store instructions 314 executable by the processor 320. For instance, the instructions 314 may include instructions, such as reviewer interface generator 317, to generate various visual analysis tools that allow human operators to visualize and adjust automatically generated labels from labeling models 315. For another instance, the instructions 314 may include training instructions for labeling models 318, which may be used to train labeling models, such as labeling models 146-148. In this regard, memory 310 may further store in instructions 314 various labeling models, which may include the labeling models 146-148, different versions of the labeling models 146-148, and/or other additional labeling models.

Although shown as a single block, the server 160 may be implemented in a single system or partitioned across multiple systems. In addition, one or more of the components of the server 160 may be implemented in a combination of software and hardware. In addition, any one of the components of the server 160 may be implemented in a computer programming language, such as C#, C++, JAVA or any other computer programming language. Similarly, any one of these components may be implemented in a computer scripting language, such as JavaScript, PHP, ASP, or any other computer scripting language. Furthermore, any one of these components may be implemented using a combination of computer programming languages and computer scripting languages.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 4:
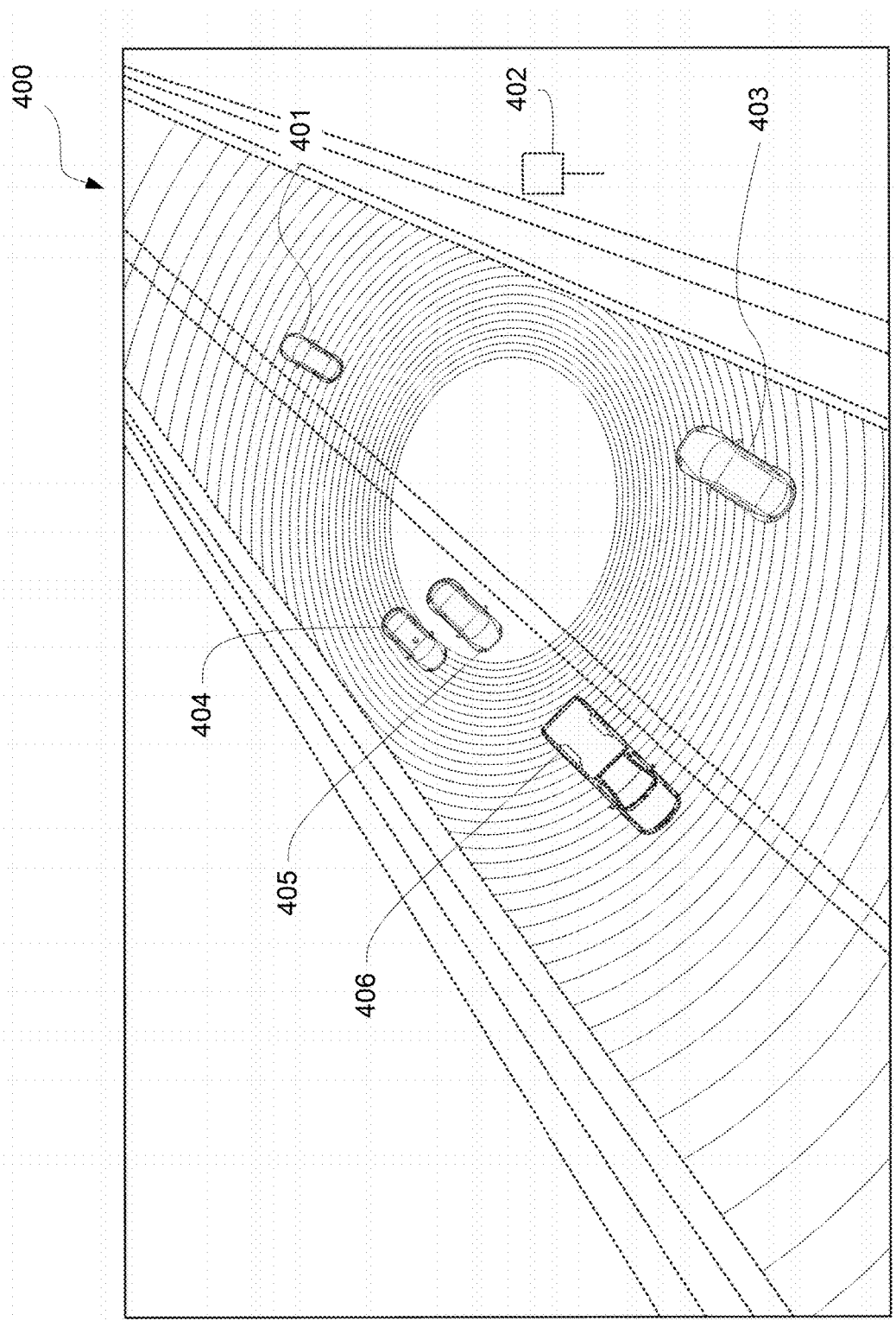
FIG. 4 shows an example LIDAR point cloud in accordance with aspects of the disclosure.

In one aspect, during a trip or a trip segment driven by vehicle 110, sensor data may be captured by the one or more sensors 120 of vehicle 110. For instance, FIG. 4 shows an example LIDAR point cloud 400 that may be captured by the one or more LIDAR sensors 124 of the autonomous vehicle 110. The LIDAR point cloud 400 shows a 360° view of a frame perceived by the autonomous vehicle 110. In this frame, the autonomous vehicle 110 is driving in a two-lane road. Various objects 401, 402, 403, 404, 405, and 406 are shown in the LIDAR point cloud 400. For example, objects 401, 403, 404, 405, and 406 may correspond to vehicles driving around the autonomous vehicle 110, while object 402 may correspond to a street sign on a side of the street. Metadata may be associated with the LIDAR point cloud 400, and in some examples may be displayed along with the LIDAR point cloud 400.

Figure 5A:
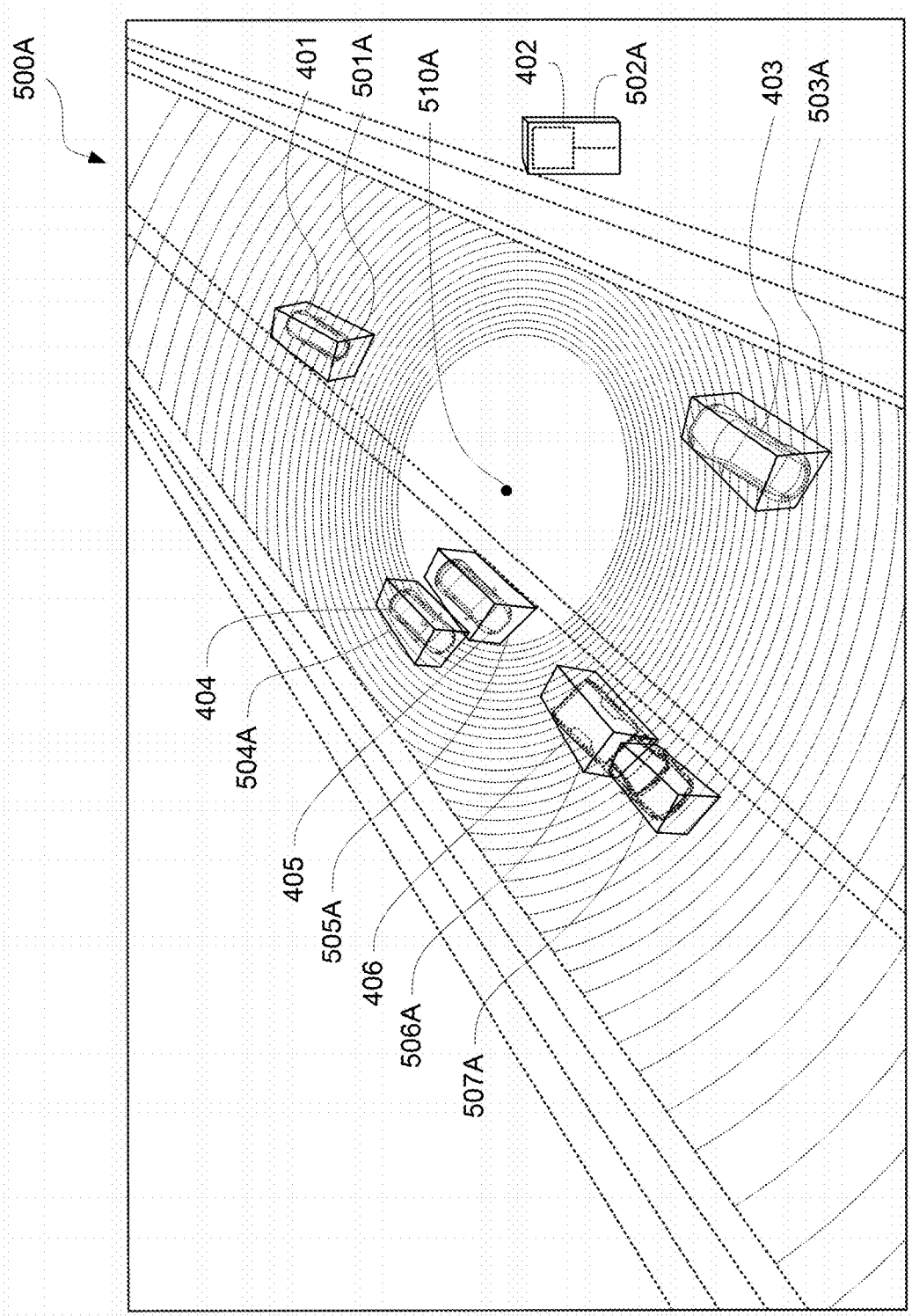
FIGS. 5A and 5B show example LIDAR point clouds with automatically generated bounding boxes in accordance with aspects of the disclosure.
Figure 5B:
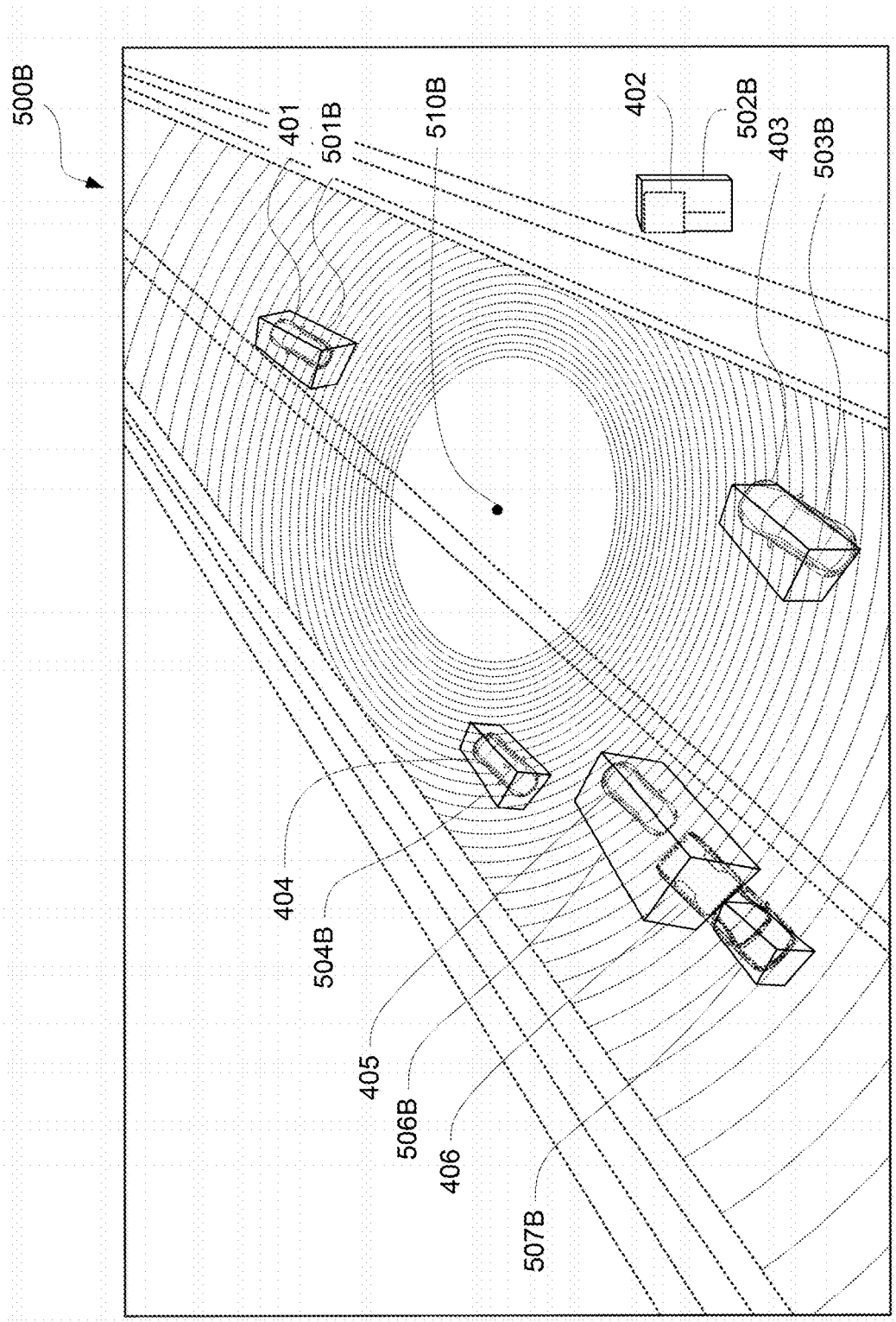

During the trip or trip segment, the sensors 120 may be continuously capturing sensor data corresponding to a series of scenes or frames perceived by vehicle 110. For example, sensor data may be captured by the sensors 120 at regular time intervals, such as every second, millisecond, etc. For instance, FIGS. 5A and 5B show two LIDAR point clouds 500A and 500B captured by LIDAR sensor 124, which correspond to two frames perceived by vehicle 110 during a trip or trip segment. For instance, LIDAR point cloud 500B may be captured at a later time point than LIDAR point cloud 500A during the trip or trip segment. In particular, LIDAR point cloud 500A and LIDAR point cloud 500B may correspond to consecutive frames in a series of frames perceived by vehicle 110 during the trip or trip segment. As shown, the same objects 401, 402, 403, 404, 405, and 406 are captured in both LIDAR point clouds 500A and 500B. Further as shown, due to movements of the objects and/or vehicle 110, positions of the objects 401-406 in LIDAR point cloud 500A are different from positions of the objects 401-406 in LIDAR point cloud 500B.

In order to identify and label objects captured by sensors 120 of vehicle 110 in the series of frames, the sensor data corresponding to the series of frames may be input into appropriate labeling models, such as one or more of the labeling models 146-148. For instance, LIDAR point clouds 500A and 500B may each be communicated by LIDAR sensor 124 to labeling model 147 stored on computing devices 130. Additionally or alternatively, LIDAR point clouds 500A and 500B may each be communicated by LIDAR sensor 124 to labeling model 147 stored on server 160.

Using the one or more of the labeling models 146-148, computing devices 130 and/or server 160 may then analyze the sensor data to determine whether there is an object present in the sensor data. The objects in the sensor data may be any type of object, such as a vehicle, pedestrian, a road sign, a traffic light, a traffic cone, or any other type of object. For instance, referring to FIG. 5A, labeling model 147 may analyze LIDAR point cloud 500A, and identify objects 401, 403, 404, and 405 as "CAR," object 406 as "TRUCK," and object 402 as "SIGN."

In this regard, labeling models 146-148 may each be configured to identify objects using parameters corresponding to a sensor type. Examples of camera parameters may include the minimal brightness of a pedestrian, the minimum pixel size of a car object, the minimum width of a car object, and other such parameters. Examples of LIDAR parameters may include the height of a pedestrian, the length of a car object, an obstacle detection threshold, and other such parameters. Examples of radar parameters may include minimum distance to an object, a delay threshold for detecting an object, the height of a pedestrian, and other such parameters.

When the labeling models 146-148 detect an object in sensor data, the labeling models 146-148 may automatically generate one or more labels for the detected object. In this regard, the labeling models 146-148 may automatically generate a label including a bounding box encompassing the detected object. The bounding box may be rectangular, oval, or any other shape. For instance, referring to FIG. 5A, labeling model 147 may automatically generate the bounding boxes by identifying LIDAR points that form clusters. In instances where an object may have LIDAR points that form two clusters, labeling model 147 may automatically generate more than one bounding boxes for that object. As shown in FIG. 5A, labeling model 147 automatically generates bounding box 501A for object 401, bounding box 502A for object 402, bounding box 503A for object 403, bounding box 504A for object 404, and bounding box 505A for object 405. Since object 406 corresponds to LIDAR points that form two clusters, one corresponding to the cab of the truck, and one corresponding to the trailer of the truck, labeling model 147 may automatically generate two bounding boxes 506A and 507A for object 406.

However, as mentioned above, sensing inaccuracies may cause displacements in automatically generated bounding boxes. For instance, referring to FIG. 5B, labeling model 147 may similarly identify objects perceived within the LIDAR point cloud 500B and automatically generate bounding boxes to encompass LIDAR points for each object. However, as shown, although the same objects 401, 402, 403, 404, 405, and 406 are detected in both LIDAR point clouds 500A and 500B, due to various sensing inaccuracies, certain bounding boxes automatically generated for LIDAR point cloud 500B may be displaced when compared to the bounding boxes automatically generated for LIDAR point cloud 500A.

For instance, due to sensor drift and/or inaccuracies in the labeling model, a bounding box automatically generated for a detected object may be displaced in another frame such that the bounding box does not include all LIDAR points for that object. For example as shown in FIG. 5B, bounding box 502B for object 402 does not contain some LIDAR points for object 402, and bounding box 503B for object 403 does not contain some LIDAR points for object 403. For instance, this may be due to a sensing inaccuracy in LIDAR sensor 124, such as a sensor drift that occurred at the time when LIDAR point cloud 500B was captured. Sensor drift of LIDAR sensor 124 may be caused by measurement errors in a localization sensor of the vehicle 110, such as a GPS sensor or a motion sensor in an inertial positioning system (INS), or by other factors such as a shift in laser frequency, occlusion, vibration of the vehicle, etc. Sensing inaccuracies such as sensor drifts often cause nonlinear changes in LIDAR point clouds, for example, some LIDAR points of a rigid object may appear separated from other LIDAR points of the object, and/or appear to move in a different direction, speed, or acceleration as other LIDAR points. Further, there may also be inaccuracies in the parameters and thresholds used by the labeling model, which may result in poor estimation and tracking of detected objects. Consequently, for example, some LIDAR points for object 402 may no longer appear to be in the same cluster as the rest of the LIDAR points for object 402, resulting in an automatically generated bounding box 502B that does not include all the LIDAR points for object 402.

As a result of sensing inaccuracies causing a displacement in an automatically generated bounding box, a stationary object may appear to be moving between consecutive frames. For instance, a position of a detected object may be estimated based on the bounding box generated for that object, such as a center of the bounding box. As such, when bounding boxes for a detected object in different frames include different sets of points, this may cause a displacement of the bounding boxes in these different frames, which in turn results in the estimated position for the detected object to appear to change. For example, since bounding box 502B does not include all the LIDAR points for object 402 as described above, bounding box 502B of FIG. 5B may be displaced such that it has a center with respect to object 402 that is offset from a center of bounding box 502A of FIG. 5A. As such, based on the bounding boxes 502A and 502B, computing devices 130 may determine that object 402 has moved between the two frames corresponding to LIDAR point clouds 500A and 500B. Controlling vehicle 110 based on such an erroneous determination may have significant consequences. For instance, computing devices 130 may control vehicle 110 to avoid object 402 based on its detected "movement," when in fact object 402 is a stationary object.

As another result of sensing inaccuracies causing a displacement in an automatically generated bounding box, a moving object may appear to have a jittering trajectory. As described above, since a position of a detected object may be estimated based on a center of the bounding box, when bounding boxes for a detected moving object include different sets of points in consecutive frames, this may cause a displacement of the bounding boxes in these different frames, which in turn results in the moving object appearing to have a jittering trajectory. For example as shown in FIGS. 5A and 5B, object 403 was driving straight without any lateral movement between the frames corresponding to LIDAR point cloud 500A and 500B. However, since bounding box 503B does not include all the LIDAR points for object 403 as described above, bounding box 503B is displaced from bounding box 503A such that a comparison between the center of bounding box 503B of FIG. 5B with the center of bounding box 503A of FIG. 5A may erroneously indicate that object 403 has also moved in a lateral direction. Controlling vehicle 110 based on such an erroneous determination may have significant consequences, since computing devices 130 may control vehicle 110 to avoid object 403 based on its detected lateral movement, which may, for example, indicate that object 403 is jittering dangerously near a lane line, when in fact object 403 is driving smoothly in its lane.

As such, the bounding boxes automatically generated by labeling model 147 may need to be reviewed and adjusted by a user to correct displacements of bounding boxes caused by sensing inaccuracies. In this regard, to allow a user to review the labels, server 160 may generate a labeling application using reviewer interface generator 317. For instance, the labeling application may display sensor data corresponding to the series of frames along with the automatically generated labels to the user. The user may review the sensor data and labels, and may confirm that a label is correct or may make adjustments. For example, the user may adjust an automatically generated bounding box by changing the coordinates and/or dimensions of the automatically generated bounding box, or click and drag on the automatically generated bounding box. Server 160 may generate the labeling application for display on the server 160, or on client devices 181-183. As such, the user may review the sensor data and labels, and make adjustments directly at the server 160, or indirectly through the client devices 181-183.

Figure 6:
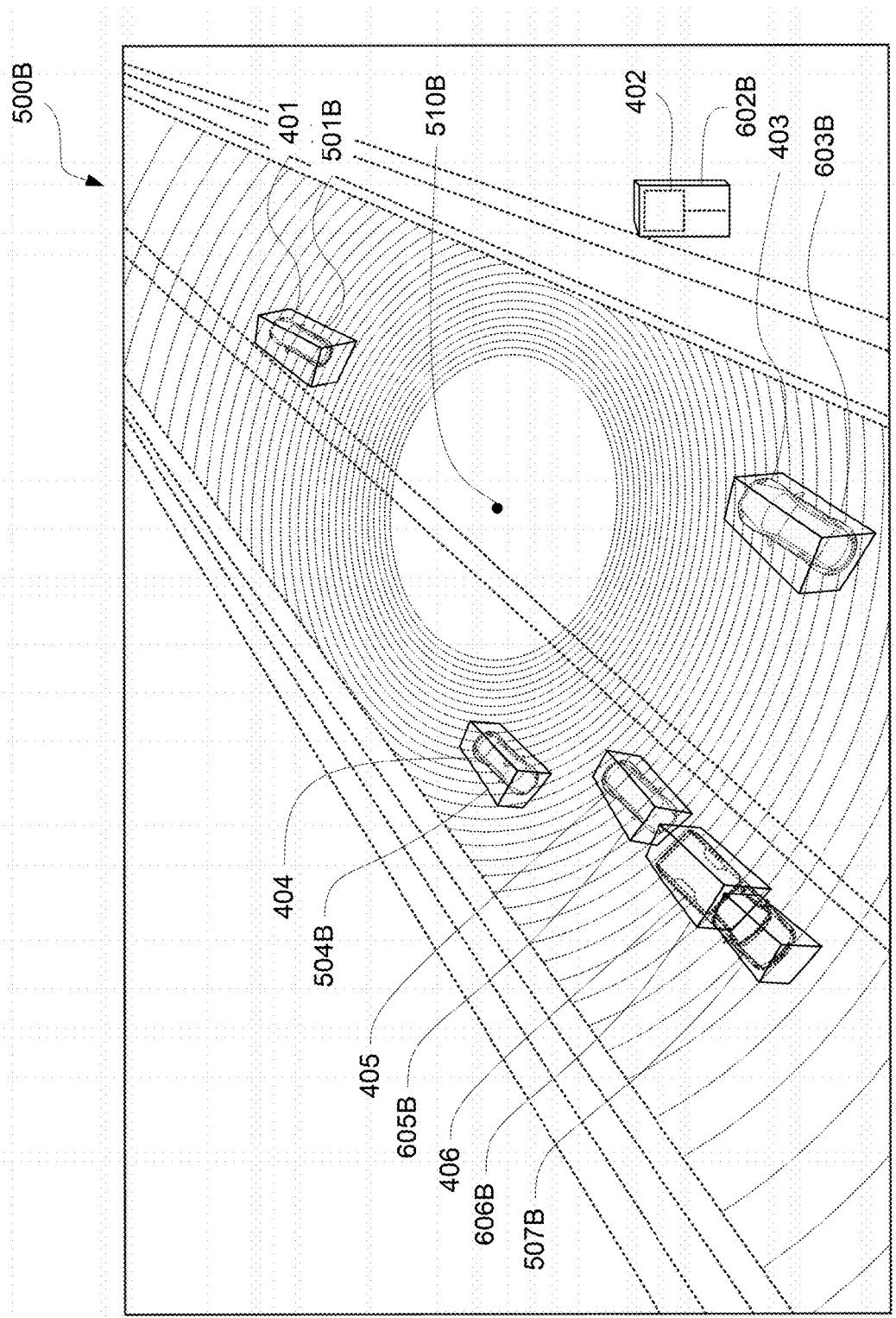
FIG. 6 shows an example LIDAR point cloud with adjusted bounding boxes in accordance with aspects of the disclosure.

FIG. 6 shows the LIDAR point cloud 500B with example adjusted labels. For example, the user may view LIDAR point cloud 500B, and determine that some LIDAR points of object 402 have not been included in bounding box 502B, and as such, bounding box 502B is displaced. The user may then adjust the bounding box 502B to correct the displacement of bounding box 502B and generate an adjusted bounding box 602B, which includes these excluded LIDAR points. Likewise, the user may determine that some LIDAR points of object 403 have not been included in bounding box 503B, and as such, bounding box 503B is displaced. The user may then adjust bounding box 503B to correct the displacement of bounding box 503B and generate an adjusted bounding box 603B, which includes these excluded LIDAR points. The user may also confirm the automatically generated bounding boxes that are not displaced to be correct, such as bounding boxes 501B, 504B, and 507B, where no adjustments are needed. In some instances, the LIDAR point cloud 500B and the automatically generated bounding boxes may also be subject to a number of different levels of review by other users in order to ensure that the bounding boxes are as accurate as possible.

Using the adjusted bounding boxes, a second labeling model may be trained to recognize and correct for displacements of bounding boxes caused by sensing inaccuracies when automatically generating bounding boxes. As mentioned above, the second labeling model to be trained may be the same as the first labeling model 147. This way, after training, the second labeling model may simply be an updated version of the labeling model 147 that generated the initial set of bounding boxes (such as those shown in FIGS. 5A and 5B). In other instances, the second labeling model may be different from labeling model 147. For example, the first labeling model may be labeling model 147 stored on server 160 for generating labels for users to review, while the second labeling model may be a model stored on computing device 130 for use onboard vehicle 110. For the purpose of illustration only and not for limitation, in the descriptions for the examples below, the first and second labeling model are both labeling model 147. In this regard, the adjusted labels 316 may be uploaded from client devices 181-183 to server 160 (or otherwise made accessible such as via network 170). Server 160 may then train labeling model 147 based on training instructions for labeling models 318.

For instance, server 160 may prepare a set of training data, which may include the sensor data corresponding to the series of frames perceived by vehicle 110 during the trip or trip segment, the automatically generated bounding that have been confirmed to be correct, as well as the adjusted bounding boxes. For instance, referring to FIGS. 5A-6, an example set of training data may include LIDAR point clouds 500A and 500B, as well as other LIDAR point clouds taken during the same trip or trip segment. The example set of training data may further include automatically generated bounding boxes 501A-507A, 501B, 504B, and 507B that have been confirmed to be correct, adjusted bounding boxes 602B, 603B, 605B, and 606B, as well as corresponding automatically generated bounding boxes and adjusted bounding boxes for other sensor data captured during the same trip or trip segment. Further, the LIDAR point clouds and the labels may be time sequenced or ordered chronologically based on the time captured during the trip or trip segment. For another instance, another example set of training data may include only the LIDAR point clouds where adjustments to one or more bounding boxes have been made by a user, such as LIDAR point cloud 500B, the automatically generated bounding boxes for such LIDAR point clouds, such as bounding boxes 501B, 504B, and 507B that have been confirmed to be correct, and the adjusted bounding boxes, such as adjusted bounding boxes 602B, 603B, 605B, and 606B.

Once the set of training data is prepared, server 160 may train the labeling model 147 in a supervised or semi-supervised manner. For instance, the chronologically ordered LIDAR point clouds, without any bounding boxes, may be used as training input, while the automatically generated bounding boxes and adjusted bounding boxes may be used as training output. This way, the labeling model 147 may be trained to automatically generate accurate bounding boxes to eliminate or reduce displacements caused by sensing inaccuracies. For instance, based on the training data, labeling model 147 may learn patterns in the LIDAR point clouds that indicate sensing inaccuracies, as well as patterns in the adjusted bounding boxes when sensing inaccuracies are present.

Alternatively or additionally, server 160 may train the labeling model 147 to recognize and correct displacements of bounding boxes caused by sensing inaccuracies based on differences between the adjusted bounding boxes and the corresponding automatically generated bounding boxes—or in other words, values of the adjustments. As discussed above, the adjustments may include, for example, changes in coordinates and/or dimensions between an automatically generated bounding box and the corresponding adjusted bounding box. For instance, the chronologically ordered LIDAR point clouds along with the automatically generated bounding boxes may be used as training input, while values of the adjustments for the adjusted bounding boxes may be used as training output. This way, the labeling model 147 may be trained to automatically generate adjustments to correct displacements of automatically generated bounding boxes caused by sensing inaccuracies.

In some instances, prior to the training, the server 160 may filter the training data based on one or more zones. For example, it may be more useful for vehicle 110 to be able to detect objects in some zones, such as on roads and/or sidewalks, than other zones, such as in a parking lot. In this regard, server 160 may categorize certain areas in the sensor data as "labeling zone," while other locations in the sensor data as "no-label zone." Server 160 may then remove data on locations labeled as "no-label zone" from the set of training data. This reduces the amount of training data, which may reduce training cost and time, as well as focus the training on automatically generating accurate labels for objects detected in locations important for controlling vehicle 110.

As server 160 continues to train the labeling model 147 using one or more sets of training data, the trained labeling model 147 stored on server 160 becomes more accurate when generating labels. As such, server 160 may update the version of labeling model 147 stored on computing devices 130 of vehicle 110 with the trained labeling model 147 stored on server 160. Additionally, as more sensor data become available on server 160, such as when captured and uploaded by vehicles such as vehicle 110 on a new trip, server 160 may continue to train the labeling model 147 with the newly available sensor data to improve performance of the labeling model 147. Further, server 160 may iteratively train labeling model 147 and replace the labeling model 147 stored on computing devices 130 of vehicle 110 with the newly trained version of labeling model 147.

The trained labeling model 147 may be used onboard vehicle 110 to detect objects in the environment of vehicle 110. For instance, as sensors 120 of vehicle 110 captures sensor data, the trained labeling model 147 may automatically generate bounding boxes accounting for sensing inaccuracies, which increases accuracy of the labeling model when automatically generating bounding boxes. For example as described above, trained labeling model 147 may generate bounding box 602B for stationary object 402, instead of bounding box 502B which erroneously excludes some LIDAR points of object 402. For another example, labeling model 147 may generate bounding box 603B for moving object 403, instead of bounding box 503B which erroneously excludes some LIDAR points of object 403.

The second labeling model may be further trained and refined in order to correct for other issues. For example, sensing inaccuracies may cause automatically generated bounding boxes for connected features to be displaced between frames, which may cause the bounding boxes for connected features to become separated between frames. For another example, due to sensing inaccuracies, jittering may result in automatically generated trajectories.

For instance, FIGS. 5A and 5B further illustrate displacements of automatically generated bounding boxes for connected features in consecutive frames, which results in the bounding boxes as well as the connected features to appear to become separated in consecutive frames perceived by the vehicle 110. For example, referring to FIG. 5A, two bounding boxes 506A and 507A are automatically generated by labeling model 147 for object 406. In FIG. 5B, again two bounding boxes 506B and 507B are automatically generated by labeling model 147 for object 406. However, due to sensing inaccuracies, labeling model 147 did not associate bounding boxes 506A and 507A as connected features that should remain connected in sensor data corresponding to subsequent frames. As such, labeling model 147 may erroneously determine that LIDAR points corresponding to the trailer of object 406 are separated from LIDAR points corresponding to the cab of object 406, resulting in automatically generated bounding boxes 506B and 507B that have a gap between them as shown in FIG. 5B. Further as shown, bounding boxes 506B and 507B are each respectively displaced from bounding boxes 506A and 507A. Further as shown, labeling model 147 may erroneously determine that LIDAR points corresponding to the trailer of object 406 and LIDAR points of object 405 form a cluster and automatically generates bounding box 506B encompassing both LIDAR points of objects 405 and 406.

To address this, the bounding boxes automatically generated by labeling model 147 may also be reviewed and adjusted by a user to correct any displacements in bounding boxes caused by incorrect association of connected features. In this regard, the user may review and adjust the automatically generated bounding boxes as described above, such as through the labeling application on server 160 or client devices 181-183. For example, referring to FIG. 6, the user may adjust bounding box 506B to generate adjusted bounding box 606B, which excludes LIDAR points of object 405 as well as eliminates the gap between bounding box 507B. The user may further manually create a bounding box 605B for object 405, for example by drawing the bounding box 605B.

Using the adjusted bounding boxes, server 160 may train labeling model 147 to automatically generate bounding boxes for connected features that remain connected for sensor data corresponding to subsequent frames perceived by vehicle 110. For instance, the example set of training data described above may further include automatically generated bounding boxes 506A, 507A, and 507B that have been confirmed to be correct for the connected features of object 406, as well as adjusted bounding box 606B for object 406. For instance, the LIDAR point clouds 500A and 500B, without any bounding boxes, may be used as training input, while the confirmed automatically generated bounding boxes 506A, 507A, and 507B, and adjusted bounding boxes 606B for object 406 may be used as training output. This way, labeling model 147 may be trained to recognize that LIDAR points in bounding box 506A and 507A should remain connected in subsequent frames, and to automatically generate bounding boxes (such as the adjusted bounding box 606B and bounding box 507B) that remain connected in subsequent frames.

In some instances, the labeling model 147 may also be trained by the server 160 to recognize and correct displacements in bounding boxes for connected features based on differences between the adjusted bounding boxes and the corresponding automatically generated bounding boxes. For instance as described above, the LIDAR point clouds along with the automatically generated bounding boxes for connected features may be used as training input, while the adjustments correcting displacements of the bounding boxes for connected features may be used as training output. This way, the labeling model 147 may be trained to automatically generate adjustments correcting displacements of bounding boxes for connected features, where the displacements cause the bounding boxes for the connected features to become separated in subsequent frames.

In another aspect, server 160 may train labeling model 147 to generate bounding boxes for connected features by using real world reference data. For instance, real world reference data on objects that have connected features may be stored on server 160 or otherwise be accessible to server 160 for training labeling model 147. For example, the real world reference data may include sizes, shapes, dimensions of objects that have connected features, such as a truck, a trailer, a train, etc. For another example, the real world reference data may include example sensor data of objects that have connected features, such as LIDAR point clouds, camera images, etc. Server 160 may prepare a set of training data using the real world reference data. For instance, server 160 may use the real world reference data of various objects described above as training input, and a label of whether connected features are found in these objects as training output. This way, server 160 may train labeling model 147 to recognize whether an object detected in a LIDAR point cloud contains connected features, and generate bounding boxes that remain connected in subsequent frames.

In a further aspect, labeling model 147 may be configured to generate a trajectory for vehicle 110 based on the sensor data corresponding to the series of frames perceived by vehicle 110. For instance, referring to FIGS. 5A and 5B, labeling model 147 may generate a position for vehicle 110 in LIDAR point cloud 500A, shown as 510A, and a position of vehicle 110 in LIDAR point cloud 500B, shown as 510B. For instance, the position of vehicle 110 may be determined based on locations of stationary objects in the LIDAR point cloud. Likewise, labeling model 147 may generate a series of positions for vehicle 110 for other sensor data corresponding to the series of frames perceived during the trip or trip segment.

Figure 7:
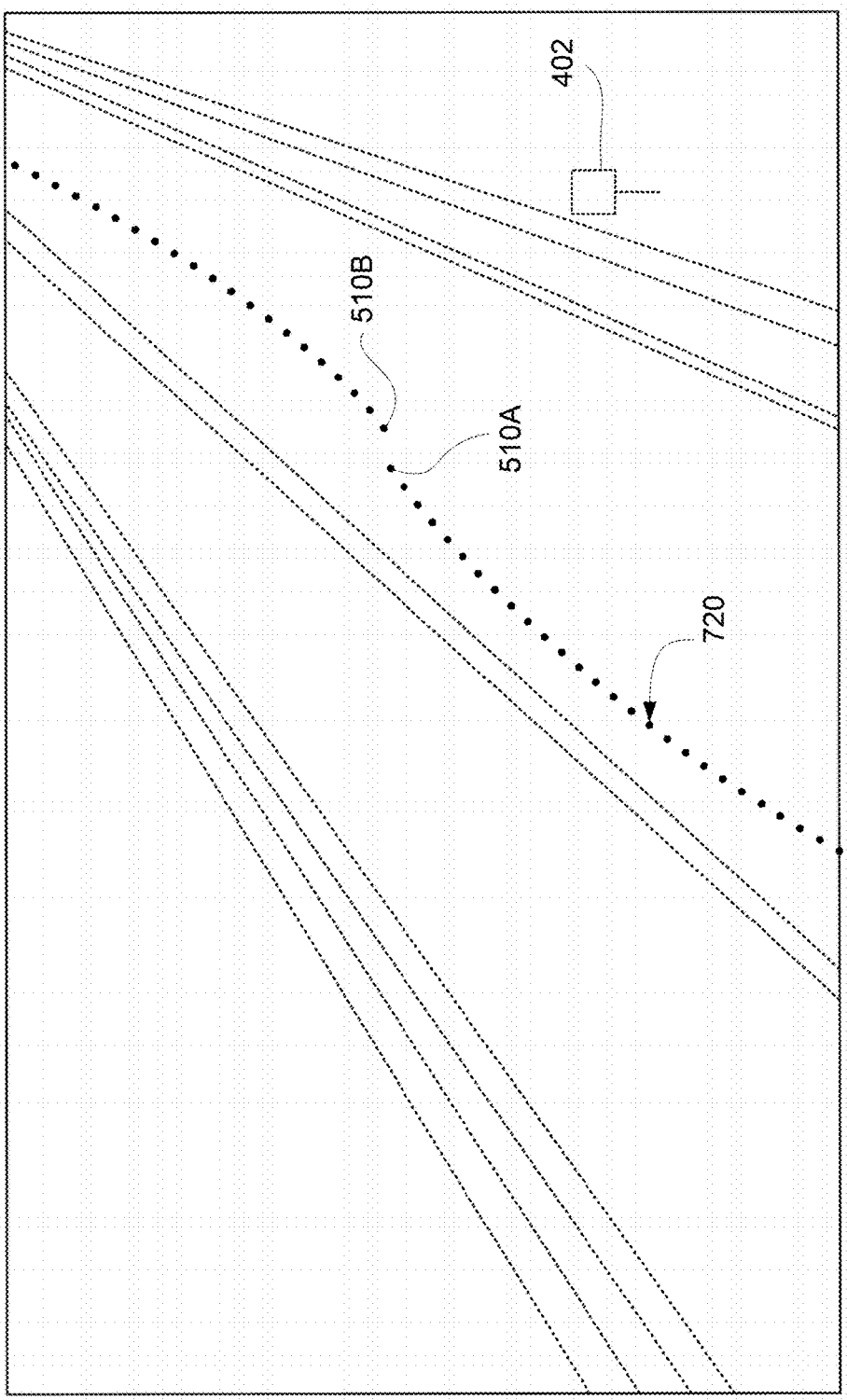
FIG. 7 shows an example trajectory of the vehicle in accordance with aspects of the disclosure.

For instance, FIG. 7 shows an example LIDAR point cloud 700 with a trajectory 720 of vehicle 110. As shown, trajectory 720 includes position 510A determined based on LIDAR point cloud 500A and position 510B determined based on LIDAR point cloud 500B, as well as a number of other positions determined based on other LIDAR point clouds captured during the trip or trip segment. Further as shown, trajectory 720 may include LIDAR point clouds of stationary objects detected during the trip or trip segment, such as object 402, and various curbs. In this regard, the LIDAR point clouds of the stationary objects may be constructed from the plurality of LIDAR point clouds corresponding to the series of frames perceived by vehicle 110 during the trip or trip segment.

As described above, sensing inaccuracies such as sensor drifts may cause displacements in automatically generated bounding boxes, which may in turn cause the automatically generated trajectory of vehicle 110 to appear jittering. For example as shown in FIG. 7, vehicle 110 appears to abruptly change its position from position 510A to position 510B. As described above, the displacements of bounding boxes caused by sensing inaccuracies may result in stationary objects to appear to move between frames, and since positions 510A and 510B may be determined based on point clouds and/or bounding boxes of stationary objects, positions 510A and 510B may also include inaccuracies.

Figure 8:
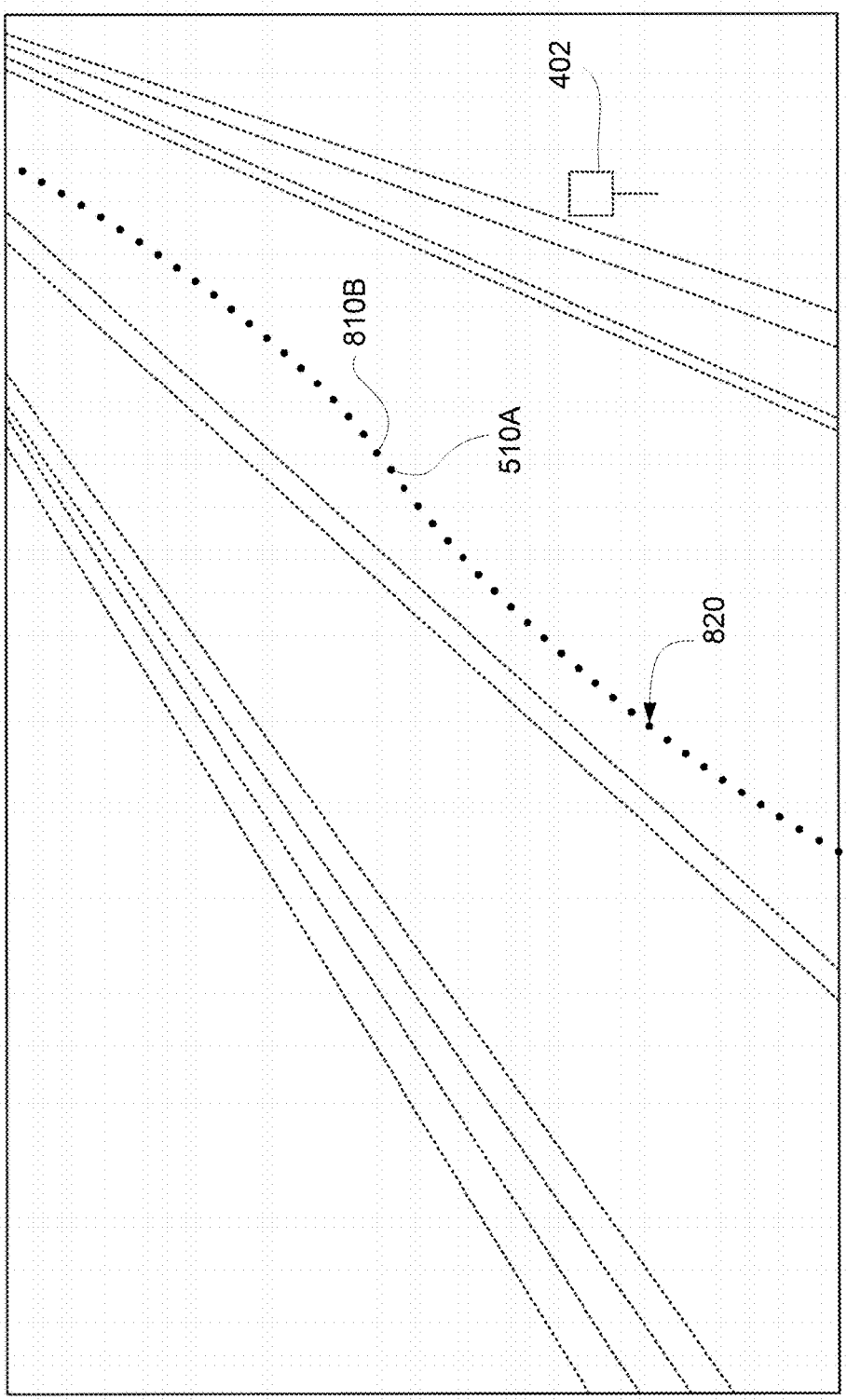
FIG. 8 shows an example adjusted trajectory of the vehicle in accordance with aspects of the disclosure.

As such, in addition to correcting the automatically generated bounding boxes, a user may also need to "smooth" the automatically generated trajectory for vehicle 110 in order to reduce the aforementioned jittering. For instance, the labeling application described above may be configured to display sensor data, such as LIDAR point cloud 700 shown in FIG. 7, including the stationary objects detected during the trip or trip segment taken by vehicle 110 as well the series of positions of vehicle 110 during the trip or trip segment. The user may review the sensor data and automatically generated trajectory, and the user may confirm that the automatically generated trajectory is correct or make adjustments. For instance, the user may change one or more position in the automatically generated trajectory to reduce or even remove the jittering. For example, FIG. 8 shows an example LIDAR point cloud 800 with an adjusted trajectory 820. For example as shown, position 510B is adjusted to position 810B to remove the jittering in the automatically generated trajectory 720.

Using the adjusted trajectory, server 160 may train labeling model 147 to smooth automatically generated trajectories. For instance, server 160 may prepare a set of training data using one or more adjusted trajectories. For instance, server 160 may use the sensor data corresponding to the series of frames perceived by vehicle 110 as training input, and the adjusted trajectory 820 as training output. This way, server 160 may train labeling model 147 to generate a smooth trajectory based on sensor data captured during a trip or trip segment by vehicle 110.

In still another aspect, labeling model 147 may be configured to automatically select a set of key frames among the series of frames perceived by the vehicle during the trip or trip segment for vehicle 110. In this regard, labeling model 147 may select a first key frame in the series of frames in which a particular object is initially detected, and a last key frame in the series of frames in which the particular object is finally detected. Labeling model 147 may then select other key frames among intermediate frames between the first key frame and the last key frame such that, using the selected set of key frames, intermediate positions of the particular object can be accurately interpolated.

In this regard, labeling model 147 may select the set of key frames using an iterative process until errors in the interpolated intermediate positions are within a predetermined threshold. For instance, labeling model 147 may calculate an initial position of the particular object in the first key frame based on the LIDAR point cloud corresponding to the first key frame, and a final position of the particular object in the last key frame based on the LIDAR point cloud corresponding to the last key frame. Using the calculated initial position and the final position, labeling model 147 may interpolate a first set of intermediate positions for the particular object in the intermediate frames. Next, labeling model 147 may determine detected intermediate positions for the particular object in the intermediate frames based on the LIDAR point clouds corresponding to these intermediate frames. Labeling model 147 may then compare the interpolated first set of intermediate positions with the detected intermediate positions of the particular object in order to determine one or more errors for the interpolated first set of intermediate positions.

As such, if the one or more errors for the interpolated first set of intermediate positions are above the predetermined threshold, labeling model 147 may interpolate a second set of intermediate positions for the particular object in the intermediate frames based on the initial position and the final position as described above, and one or more additional positions determined based on the LIDAR point clouds corresponding to one or more additional frames among the intermediate frames. Labeling model 147 may then compare the interpolated second set of intermediate positions with the detected intermediate positions of the particular object in order to determine one or more errors for the interpolated second set of intermediate positions. Next, labeling model 147 may compare the one or more errors for the interpolated second set of intermediate positions with the predetermined threshold, and repeat the process until errors of interpolated intermediate positions are within the predetermined threshold. As such, the resulting set of key frames may include the first key frame, the last key frame, and any additional frames used to interpolate intermediate positions within the predetermined threshold in the iterative process described above.

The automatic selection of key frames may be use in a number of ways. For instance, server 160 may use sensor data corresponding to the key frames to interpolate a trajectory for the particular object detected in the key frames. In this regard, server 160 may connect the initial position, the final position, and the interpolated intermediate positions of the particular object to generate an interpolated trajectory for the particular object. Further, server 160 may be configured to present the interpolated trajectory along with sensor data and automatically generated labels for the particular object for further review by users. As such, this allows users to review labels and the trajectory for a particular object at once, which may significantly reduce the amount of time and cost needed to review labels. For another example, server 160 may be configured to prepare training data for training labeling model 147 using only the sensor data and labels corresponding to the key frames. As such, the amount of time and resources needed to train labeling model 147 may be reduced.

In some instances, labeling model 147 may be further configured to keep one or more properties of a detected object consistent across multiple frames perceived during the trip or trip segment. For instance, labeling model 147 may be configured to identify a frame where a particular object is most clearly detected, and determine one or more properties of the particular object using LIDAR point cloud corresponding to the identified frame. In this regard, the frame where a particular object is most clearly detected may be identified based on predetermined rules or heuristics, such as the frame in which the particular object is detected to be closest to the vehicle 110 (than other frames in which the particular object is also detected) and/or there is no occlusion in the sensor data for that frame. For example, labeling model 147 may determine a type of the particular object (such as pedestrian, vehicle, etc.). For another example, labeling model 147 may determine dimensions of the particular object (including for example size, shape, etc.). Once the one or more properties of the particular object are determined based on the identified frame, labeling model 147 may label the particular object with the same determined properties in all other frames in which the particular object is also detected.

Figure 9:
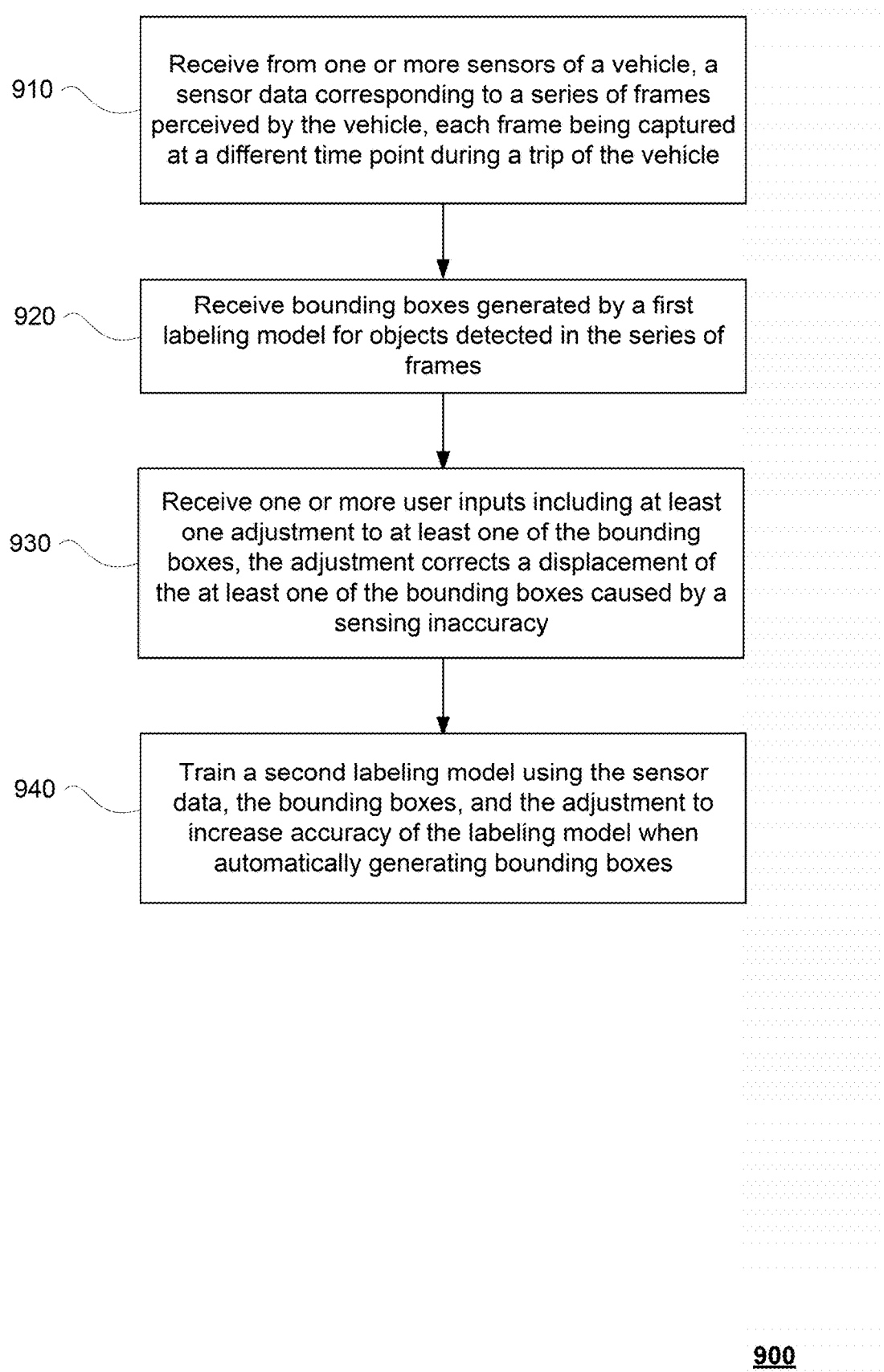
FIG. 9 shows an example flow diagram in accordance with aspects of the disclosure.

FIG. 9 is a flow diagram 900 of an example method for training a labeling model. For example, server 160 may perform the method shown in flow diagram 900. In block 910, sensor data corresponding to a series of frames perceived by the vehicle is received from one or more sensors of a vehicle, each frame being captured at a different time point during a trip of the vehicle. In block 920, bounding boxes generated by a first labeling model for objects detected in the series of frames are received. In block 930, one or more user inputs including at least one adjustment to at least one of the bounding boxes are received, the adjustment corrects a displacement of the at least one of the bounding boxes caused by a sensing inaccuracy. In block 940, a second labeling model is trained using the sensor data, the bounding boxes, and the adjustment to increase accuracy of the labeling model when automatically generating bounding boxes.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of training a labeling model, comprising:
receiving, by one or more computing devices from one or more sensors of a vehicle, sensor data corresponding to a series of frames perceived by the vehicle, each frame being captured at a different time point during a trip of the vehicle;
receiving, by the one or more computing devices, bounding boxes generated by a first labeling model for objects detected in the series of frames, wherein the first labeling model is configured to automatically select a set of key frames among the series of frames, the set of key frames being frames in which a particular object detected in the set of key frames can be determined with errors within a predetermined threshold;
receiving, by the one or more computing devices, the set of key frames automatically selected by the first labeling model;
selecting, by the one or more computing devices, sensor data and bounding boxes corresponding to the set of key frames; and
training, by the one or more computing devices, a second labeling model using the selected sensor data and the selected bounding boxes to increase accuracy of the second labeling model when automatically generating bounding boxes.

2. The method of claim 1, further comprising, receiving, by the one or more computing devices, one or more user inputs including at least one adjustment to at least one of the received bounding boxes, the adjustment corrects a displacement of the at least one of the received bounding boxes caused by a sensing inaccuracy, and wherein the training further uses the at least one adjustment.

3. The method of claim 2, further comprising:
generating, by the one or more computing devices, at least one adjusted bounding box based on the at least one adjustment, wherein training the second labeling model is further based on the at least one adjusted bounding box.

4. The method of claim 2, wherein the sensing inaccuracy results in a stationary object appearing to move between frames when the at least one bounding box of a first frame of the series of frames is compared to a respective bounding box of a second frame of the series of frames.

5. The method of claim 1, wherein the sensing inaccuracy results in a moving object appearing to have a jittering trajectory when the at least one of the bounding boxes of a first frame of the series of frames is compared to a respective bounding box of a second frame of the series of frames.

6. The method of claim 1, wherein the first labeling model is configured to automatically generate a position of the vehicle for each frame of the series of frames, and to automatically generate a trajectory of the vehicle based on the position for each frame of the series of frames.

7. The method of claim 6, further comprising:
receiving, by the one or more computing devices, the trajectory of the vehicle automatically generated by the first labeling model;
receiving, by the one or more computing devices, one or more user inputs including at least one adjustment to the trajectory, the adjustment to the trajectory reduces jittering of the trajectory; and
training, by the one or more computing devices, the second labeling model using the sensor data, the trajectory, and the adjustment to the trajectory to automatically generate a smooth trajectory for the vehicle.

8. The method of claim 7, further comprising generating, by the one or more computing devices, using the selected sensor data corresponding to the set of key frames, an interpolated trajectory for the particular object.

9. The method of claim 8, further comprising presenting, by the one or more computing devices, the selected sensor data, selected bounding boxes, and the interpolated trajectory for review by a user.

10. The method of claim 1, further comprising categorizing, by the one or more computing devices, one or more areas detected in the sensor data as no-label zones, wherein the no-label zones are excluded from the training.

11. The method of claim 1, further comprising:
sending, by the one or more computing devices, the trained second labeling model to one or more computing devices of the vehicle for use onboard the vehicle.

12. A method of training a labeling model, comprising:
receiving, by one or more computing devices from one or more sensors of a vehicle, sensor data corresponding to a series of frames perceived by the vehicle, each frame being captured at a different time point during a trip of the vehicle;
receiving, by the one or more computing devices, bounding boxes generated by a first labeling model for objects detected in the series of frames, wherein the first labeling model is configured to automatically generate a position of the vehicle for each frame of the series of frames, and to automatically generate a trajectory of the vehicle based on the position for each frame of the series of frames;
receiving, by the one or more computing devices, the trajectory of the vehicle automatically generated by the first labeling model;
receiving, by the one or more computing devices, one or more user inputs including at least one adjustment to the trajectory, the adjustment to the trajectory reduces jittering of the trajectory; and
training, by the one or more computing devices, a second labeling model using the sensor data, the bounding boxes, the trajectory, and the adjustment to the trajectory to automatically generate a smooth trajectory for the vehicle.

13. The method of claim 12, further comprising, receiving, by the one or more computing devices, one or more user inputs including at least one adjustment to at least one of the received bounding boxes, the adjustment corrects a displacement of the at least one of the received bounding boxes caused by a sensing inaccuracy, and wherein the training further uses the at least one adjustment.

14. The method of claim 13, further comprising:
generating, by the one or more computing devices, at least one adjusted bounding box based on the at least one adjustment, wherein training the second labeling model is further based on the at least one adjusted bounding box.

15. The method of claim 14, wherein the sensing inaccuracy results in a stationary object appearing to move between frames when the at least one bounding box of a first frame of the series of frames is compared to a respective bounding box of a second frame of the series of frames.

16. The method of claim 14, wherein the sensing inaccuracy results in a moving object appearing to have a jittering trajectory when the at least one of the bounding boxes of a first frame of the series of frames is compared to a respective bounding box of a second frame of the series of frames.

17. The method of claim 16, wherein the jittering trajectory results from bounding boxes for the moving object including different sets of points in consecutive frames which causes a displacement of the bounding boxes for the moving objects in the consecutive frames.

18. The method of claim 12, wherein the jittering of the trajectory results as sensor inaccuracies causing displacements in the bounding boxes.

19. The method of claim 18, wherein the sensor inaccuracies include sensor drift.

20. The method of claim 12, wherein the user input changes one or more positions in the trajectory.

* * * * *

UNITED STATES PATENT AND TRADEMARK OFFICE
CERTIFICATE OF CORRECTION

| | | |
|---|---|---|
| PATENT NO. | : 11,556,744 B1 | |
| APPLICATION NO. | : 17/116255 | |
| DATED | : January 17, 2023 | |
| INVENTOR(S) | : Aditya Joshi, Ingrid Fiedler and Lo Po Tsui | |

It is certified that error appears in the above-identified patent and that said Letters Patent is hereby corrected as shown below:

In the Claims

Claim 4, Column 20, Line 67:
Now reads: "the at least one bounding box"; should read -- at least one bounding box --

Claim 5, Column 21, Line 5:
Now reads: "the at least one of the bounding boxes"; should read -- at least one bounding box --

Claim 15, Column 22, Line 13:
Now reads: "the at least one bounding box"; should read -- at least one bounding box --

Claim 16, Column 22, Lines 36 and 37:
Now reads: "the at least one of the bounding boxes"; should read -- at least one bounding box --

Claim 20, Column 22, Lines 50 and 51:
Now reads: "the user input changes"; should read -- the one or more user inputs change --

Signed and Sealed this
Twenty-eighth Day of February, 2023

Katherine Kelly Vidal
*Director of the United States Patent and Trademark Office*